UNITED STATES PATENT OFFICE.

ARTHUR LIEBRECHT, OF FRANKFORT-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

ISOVALERAMID DERIVATIVE AND PROCESS OF MAKING SAME.

SPECIFICATION forming part of Letters Patent No. 697,730, dated April 15, 1902.

Application filed July 17, 1901. Serial No. 68,622. (Specimens.)

*To all whom it may concern:*

Be it known that I, ARTHUR LIEBRECHT, Ph. D., a citizen of the Empire of Germany, residing at Frankfort-on-the-Main, Germany, have invented certain new and useful Improvements in Isovaleramid Derivatives and Processes of Making Same, of which the following is a specification.

The dialkylated derivatives of isovaleramid and bromisovaleramid, unlike valeramid and isovaleramid, which are of little effect, have a strong action as drugs, rendering them valuable in therapeutics. These dialkylated isovaleramids have hitherto been unknown. Only the alphylamids of isovaleric acid and its bromin derivatives and a benzyl-bromisovaleramid have been described; but these, like the dialkylamids of trimethylacetic acid, are unimportant in pharmacology.

This invention relates to the manufacture of these derivatives of isovaleramid. For this purpose isovaleric acid, its anhydrid, ester, amid, acid chlorid, or the corresponding derivatives from bromovaleric acid are treated with secondary amins. Instead of isovaleric acid the ordinary officirial baldrianic acid may be used, its principal constituent being isovaleric acid.

The following examples illustrate the invention.

Example I: The isovalerate of diethylamin is heated for six hours at 230° centigrade in a closed vessel, and the product thus obtained is dissolved in ether and shaken with a solution of sodium carbonate to remove unchanged valeric acid. The etherial solution is then dried, the ether evaporated, and the residue distilled, whereupon the isovaler-diethylamid passes over as a liquid at 205° to 208° centigrade. The product has an odor like that of peppermint. It is readily soluble in alcohol and ether and is soluble with difficulty in water.

Example II: One molecular proportion of bromisovaleryl bromid is dropped into a well-cooled solution of somewhat more than two molecular proportions of diethylamin in much ether, whereupon a lively reaction occurs. The product is washed with water to remove the hydrobromid of diethylamin and excess of diethylamin. The etherial solution is then dried and distilled in a vacuum. After the ether has passed over the bromisovaler-diethylamid distils at 130° to 135° centigrade and twenty millimeters pressure. The product is very easily soluble in alcohol and benzene, but less soluble in ether. It is soluble with difficulty in water.

Having now described my invention, what I claim is—

1. Process for the manufacture of dialkylated amids of isovaleric and bromisovaleric acids, which consists in treating the compounds of isovaleric acid described with dialkylated amins, substantially as set forth.

2. As a new product, the dialkylated amid of isovaleric acid, distilling between 205° and 208° at twenty millimeters pressure, soluble with difficulty in water, readily soluble in alcohol, and benzene, but less soluble in ether, substantially as set forth.

In testimony that I claim the foregoing as my invention I have signed my name in presence of two subscribing witnesses.

ARTHUR LIEBRECHT.

Witnesses:
ALFRED BRISBOIS,
JOHANN HARTENSTEIN.